US012728638B2

(12) United States Patent
Watanabe

(10) Patent No.: US 12,728,638 B2
(45) Date of Patent: Sep. 8, 2026

(54) LIQUID DISCHARGE HEAD, LIQUID DISCHARGE DEVICE, AND LIQUID DISCHARGE APPARATUS

(71) Applicant: Yu Watanabe, Kanagawa (JP)

(72) Inventor: Yu Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 132 days.

(21) Appl. No.: 18/918,165

(22) Filed: Oct. 17, 2024

(65) Prior Publication Data

US 2025/0135774 A1 May 1, 2025

(30) Foreign Application Priority Data

Oct. 31, 2023 (JP) ................................ 2023-186786
Jul. 17, 2024 (JP) ................................ 2024-114231

(51) Int. Cl.
*B41J 2/14* (2006.01)
*B41J 2/045* (2006.01)

(52) U.S. Cl.
CPC ............ *B41J 2/14233* (2013.01); *B41J 2/045* (2013.01); *B41J 2/04581* (2013.01); *B41J 2002/14241* (2013.01); *B41J 2002/14258* (2013.01); *B41J 2002/14419* (2013.01); *B41J 2202/12* (2013.01)

(58) Field of Classification Search
CPC .... B41J 2/14233; B41J 2/045; B41J 2/04581; B41J 2002/14241; B41J 2002/14258; B41J 2002/14419; B41J 2202/12
See application file for complete search history.

(56) References Cited

U.S. PATENT DOCUMENTS

| | | | | |
|---|---|---|---|---|
| 2012/0212547 | A1* | 8/2012 | Takemoto | B41J 2/04541 347/70 |
| 2015/0375505 | A1* | 12/2015 | Takahashi | B41J 2/055 239/302 |
| 2017/0100934 | A1* | 4/2017 | Masuda | B41J 2/1623 |
| 2023/0135522 | A1 | 5/2023 | Watanabe et al. | |
| 2023/0249453 | A1 | 8/2023 | Watanabe | |
| 2023/0286277 | A1 | 9/2023 | Watanabe | |

(Continued)

FOREIGN PATENT DOCUMENTS

| | | |
|---|---|---|
| JP | 2013-059934 A | 4/2013 |
| JP | 2015-085565 A | 5/2015 |

(Continued)

*Primary Examiner* — Henok D Legesse
(74) *Attorney, Agent, or Firm* — XSENSUS LLP

(57) ABSTRACT

A liquid discharge head includes a piezoelectric element, a flexible damper, a first holding substrate, and a second holding substrate. The first holding substrate is bonded to a first face of the flexible damper. The first holding substrate has a recess accommodating the piezoelectric element, a first partition having a first width, and first side spaces partitioned by the first partition. The first side spaces face the first face. The second holding substrate is bonded to a second face of the flexible damper. The second holding substrate has a second partition opposed to the first partition via the flexible damper, second side spaces partitioned by the second partition, and openings respectively opposed to both ends of the first partition via the flexible damper. The second partition has a second width wider than the first width. The second side spaces face the second face.

10 Claims, 16 Drawing Sheets

(56) References Cited

U.S. PATENT DOCUMENTS

| | | | | |
|---|---|---|---|---|
| 2023/0398779 | A1 * | 12/2023 | Masuda | B41J 2/1623 |
| 2024/0075741 | A1 | 3/2024 | Watanabe | |
| 2024/0198672 | A1 | 6/2024 | Matsuda et al. | |

FOREIGN PATENT DOCUMENTS

| | | | |
|---|---|---|---|
| JP | 2016-026912 | A | 2/2016 |
| JP | 2023-180465 | A | 12/2023 |

* cited by examiner

FIG. 3 COMPARATIVE EXAMPLE

COMPARATIVE EXAMPLE

FIG. 5 COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2023-186786, filed on Oct. 31, 2023, and 2024-114231, filed on Jul. 17, 2024, in the Japan Patent Office, the entire disclosure of each of which is hereby incorporated by reference herein.

BACKGROUND

Technical Field

Embodiments of the present disclosure relate to a liquid discharge head, a liquid discharge device, and a liquid discharge apparatus.

Related Art

In the related art, an inkjet image forming apparatus includes a liquid discharge head. The liquid discharge head includes a liquid chamber substrate, a piezoelectric element holding substrate, a damper, and a damper holding substrate. The liquid chamber substrate defines an individual liquid chamber communicating with a nozzle. The piezoelectric element holding substrate is bonded to the liquid chamber substrate on a side opposite to a nozzle plate having the nozzle. The piezoelectric element holding substrate defines a recess accommodating a piezoelectric element. The damper dissipates vibration energy to dampen impact or amplitude of vibration. The damper holding substrate defines a space in which the damper vibrates. A material of the damper may be deposited on a substrate, the damper holding substrate may be bonded to a surface of the damper deposited on the substrate with an adhesive, and then the bonded substrate may be polished and etched to expose the material of the damper to bond the damper and the damper holding substrate.

SUMMARY

Embodiments of the present disclosure describe an improved liquid discharge head that includes a piezoelectric element, a flexible damper, a first holding substrate, and a second holding substrate. The flexible damper has a first face and a second face opposite to the first face. The first holding substrate is bonded to the first face of the flexible damper in a bonding direction. The first holding substrate has a recess accommodating the piezoelectric element, a first partition having a first width in a width direction orthogonal to the bonding direction, and first side spaces partitioned by the first partition. The first side spaces face the first face of the flexible damper. The second holding substrate is bonded to the second face of the flexible damper in the bonding direction. The second holding substrate has a second partition opposed to the first partition via the flexible damper, second side spaces partitioned by the second partition, and openings at both ends of the first partition in the width direction. The openings are respectively opposed to the both ends of the first partition via the flexible damper. The second partition has a second width wider than the first width in the width direction. The second side spaces face the second face of the flexible damper.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
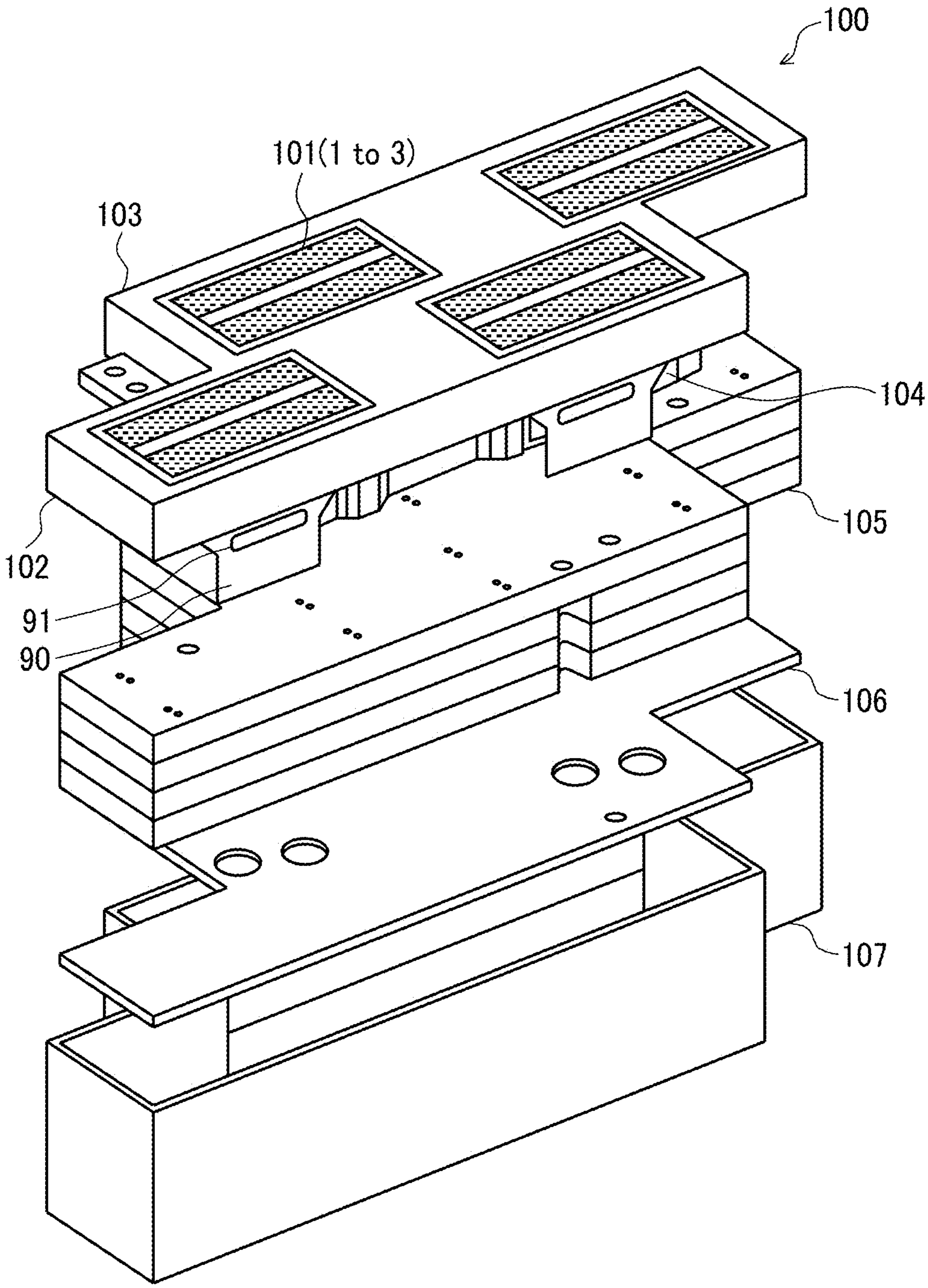
FIG. 1 is a schematic exploded perspective view of a liquid discharge device including a liquid discharge head according to a comparative example, to which an embodiment of the present disclosure is applicable, as viewed from a nozzle face side.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A typical liquid discharge head includes multiple nozzles, multiple individual liquid chambers respectively communicating with the multiple nozzles, actuators to generate energy for increasing a pressure of a liquid such as ink in the individual liquid chambers, and a common liquid chamber communicating with the individual liquid chambers. In this liquid discharge head, the liquid (ink) is supplied from the common liquid chamber to each individual liquid chamber communicating with each nozzle, and the actuator corresponding to each individual liquid chamber is driven to increase the pressure of the liquid (ink) in each individual liquid chamber so as to discharge the ink from the nozzle. At this time, if pressure fluctuation of the liquid (ink) generated in the individual liquid chamber is propagated to the common liquid chamber communicating with each individual liquid chamber as vibration, mutual interference affecting the liquid (ink) in the adjacent individual liquid chambers may occur due to the propagated vibration, causing leakage, unintended discharge, or unstable discharge of the liquid (ink) from the nozzle. As a result, a high quality image may not be obtained.

Figure 2:
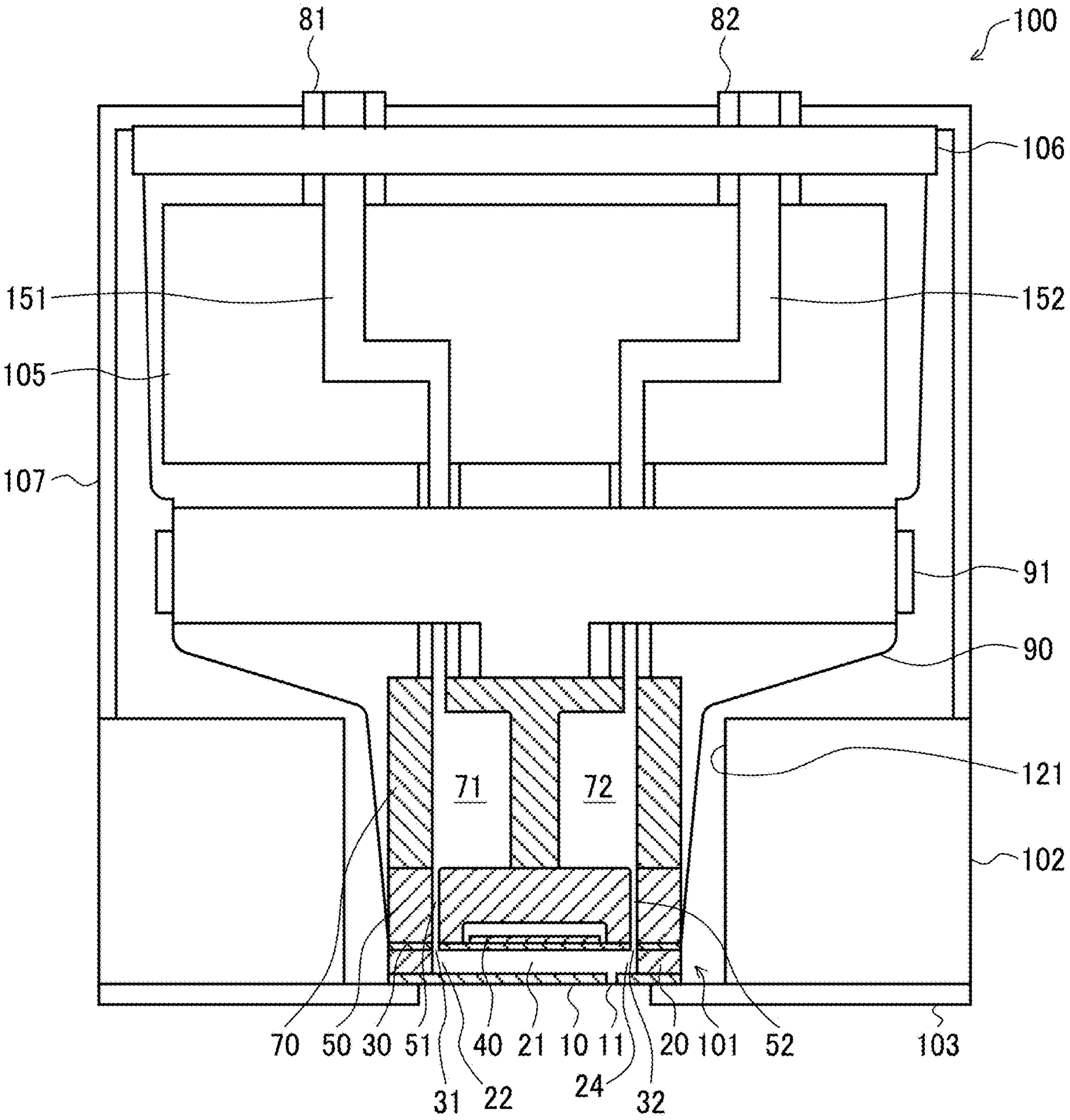
FIG. 2 is a schematic cross-sectional view of the liquid discharge device in a transverse direction (width direction) of the liquid discharge head according to the comparative example, to which an embodiment of the present disclosure is applicable.

FIG. 1 is a schematic exploded perspective view of a liquid discharge device 100 including a liquid discharge head 101 according to a comparative example. Liquid discharge heads 1 to 3 according to embodiments of the present disclosure can also applied to the liquid discharge device 100 instead of the liquid discharge head 101. FIG. 2 is a schematic cross-sectional view of the liquid discharge device 100 in a transverse direction (width direction) of the liquid discharge head 101. In FIG. 1, the liquid discharge device 100 includes multiple liquid discharge heads 101 that discharge a liquid, a base 102 that holds the multiple liquid discharge heads 101, and a cover 103 serving as a nozzle cover that covers the multiple liquid discharge heads 101. The liquid discharge device 100 further includes a heat dissipator 104, a manifold 105 defining channels to supply the liquid to the multiple liquid discharge heads 101, a printed circuit board (PCB) 106 coupled to a flexible wiring 90 including a driver integrated circuit (IC) 91, and a module case 107.

Each of the multiple liquid discharge heads 101 includes a nozzle plate 10, a channel substrate 20, a diaphragm 30, a piezoelectric element holding substrate 50, and a common channel frame 70. Nozzles 11 are formed in the nozzle plate 10. The channel substrate 20 defines individual chambers 21 serving as pressure chambers communicating with the nozzles 11, respectively. The diaphragm 30 includes piezoelectric elements 40. The piezoelectric element holding substrate 50 is laminated over the diaphragm 30. The common channel frame 70 is laminated over the piezoelectric element holding substrate 50.

A material of the nozzle plate 10 is a single-crystal silicon wafer. In addition to the individual chambers 21, the channel substrate 20 defines supply-side individual channels 22 communicating with the individual chambers 21 and collection-side individual channels 24 communicating with the individual chambers 21, respectively.

Figure 3:
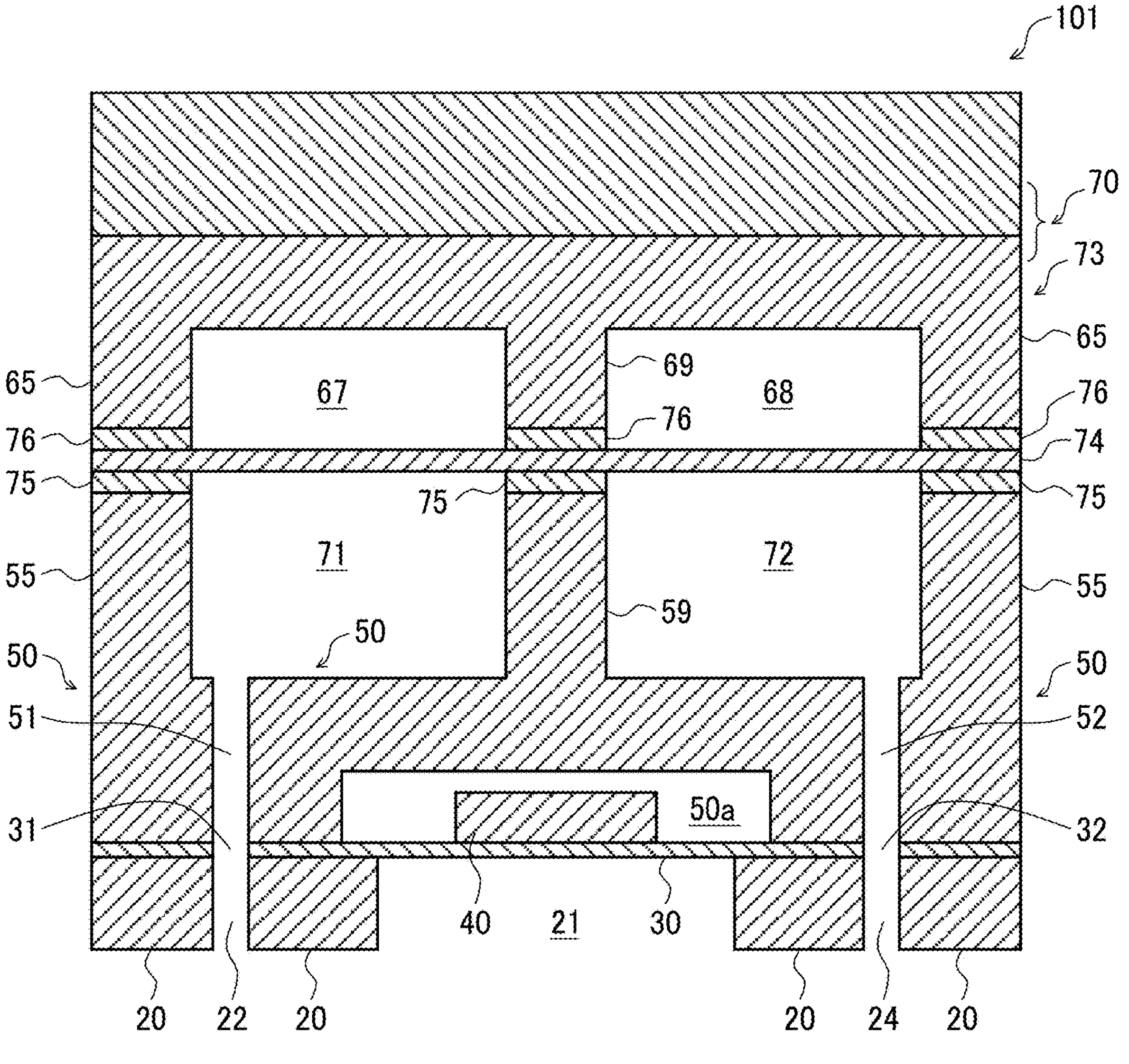
FIG. 3 is a schematic cross-sectional view of a portion of the liquid discharge head between a channel substrate and a common channel frame according to a comparative example.

A material of the piezoelectric element holding substrate 50 is a single-crystal silicon wafer. The piezoelectric element holding substrate 50 defines supply-side intermediate individual channels 51 and collection-side intermediate individual channels 52. The supply-side intermediate individual channels 51 communicate with the supply-side individual channels 22 via openings 31 of the diaphragm 30. The collection-side intermediate individual channels 52 communicate with the collection-side individual channels 24 via openings 32 of the diaphragm 30. As illustrated in FIG. 3, the piezoelectric element holding substrate 50 defines a recess **50*a* to accommodate the piezoelectric elements 40**.

As illustrated in FIG. 3, the piezoelectric element holding substrate 50 and the common channel frame 70 defines a supply-side common channel 71 and a collection-side common channel 72 as first side spaces, and second side spaces 67 and 68 described later. The supply-side common channel 71 communicates with the supply-side intermediate individual channels 51. The collection-side common channel 72 communicates with the collection-side intermediate individual channels 52.

The supply-side common channel 71 communicates with a supply port 81 via a channel 151 of the manifold 105, and the collection-side common channel 72 communicates with a collection port 82 via a channel 152 of the manifold 105.

The PCB 106 and the piezoelectric elements 40 are connected to each other via the flexible wiring 90, and the driver IC 91 is mounted on the flexible wiring 90.

In the comparative example, the multiple liquid discharge heads 101 (multiple liquid discharge heads 1, 2, or 3 in the present embodiment) are attached to the base 102 at predetermined intervals. The liquid discharge head 101 is inserted into an opening 121 in the base 102, and the peripheral end of the nozzle plate 10 of the liquid discharge head 101 is bonded and fixed to the cover 103, which is bonded and fixed to the base 102, to attach the liquid discharge head 101 to the base 102.

A flange disposed outside the common channel frame 70 of the liquid discharge head 101 is bonded and fixed to the base 102. A structure for fixing the liquid discharge head 101 to the base 102 is not limited to the above-described structure. The liquid discharge head 101 may be fixed to the base 102 by, for example, bonding, swaging, riveting, or screwing.

In the present embodiment, the base 102 is preferably formed of a material having a low coefficient of linear expansion. Examples of the material having the low coefficient of linear expansion include 42alloy in which nickel is added to iron and an invar material. In the comparative example and the present embodiment, the invar material is used.

With such a configuration, the liquid discharge head 101 can reduce a displacement of the nozzles 11 from a predetermined nozzle position to reduce a deviation of a landing position of a liquid discharged from the nozzles 11 of the liquid discharge head 101 even if the temperature of the base 102 is increased by heat generated by the liquid discharge head 101 since an amount of thermal expansion of the base 102 is small.

Similarly, each of the nozzle plate 10, the channel substrate 20, and the diaphragm 30 is formed of a silicon single-crystal substrate, and has substantially the same coefficient of linear expansion as that of the base 102. This configuration can reduce the displacement of the nozzle 11 caused by thermal expansion.

FIG. 3 is a schematic cross-sectional view of a portion of the liquid discharge head 101 between the channel substrate 20 and the common channel frame 70.

In FIG. 3, a damper 74 which is flexible (i.e., a flexible damper) is disposed below the common channel frame 70. The damper 74 is deformed so as to be bent according to the pressure of liquid. As a result, the damper 74 can attenuate an impact due to the pressure of the liquid or vibration of the pressure of the liquid. The damper 74 is preferably formed of a thin metal film or an inorganic thin film which is resistant to an organic solvent, and the thickness thereof is preferably 10 μm or less. One face of the damper 74 (i.e., a first face) is bonded to the piezoelectric element holding substrate 50 via an adhesive 75 in a bonding direction, and the other face of the damper 74 (i.e., a second face) is bonded to a damper holding substrate 73 of the common channel frame 70 via an adhesive 76 in the bonding direction. In other words, the common channel frame 70 includes the damper holding substrate 73 bonded to the damper 74, and a material of the damper holding substrate 73 is a single-crystal silicon wafer. The adhesive 75 is selected as the most suitable adhesive for bonding the damper 74 and the piezoelectric element holding substrate 50, and the adhesive 76 is selected as the most suitable adhesive for bonding the damper 74 and the damper holding substrate 73. The adhesive 75 and the adhesive 76 are made of, for example, a thermosetting resin.

The damper holding substrate 73 and the damper 74 may be manufactured by using a semiconductor process. In this case, a material of the damper 74 is deposited on a wafer serving as a substrate. A surface of the damper 74 is bonded to the damper holding substrate 73 in which a space is formed by patterning. The damper 74 vibrates in the space.

The piezoelectric element holding substrate 50 includes a partition wall 59 as a first partition that separates the supply-side common channel 71 and the collection-side common channel 72. The damper 74 vibrates in the supply-side common channel 71 and the collection-side common channel 72 which are referred to as the first side spaces. The piezoelectric element holding substrate 50 further includes side walls 55 disposed at both ends thereof in FIG. 3. The side walls 55 have the same width as the partition wall 59.

The damper holding substrate 73 has a partition wall 69 as a second partition that separates the second side space 67 and the second side space 68. The second side space 67 is opposed to the supply-side common channel 71. The second side space 68 is opposed to the collection-side common channel 72. The damper 74 vibrates in the second side spaces 67 and 68. The damper holding substrate 73 further includes side walls 65 disposed at both ends thereof in FIG. 3. The side walls 65 have the same width as the partition wall 69.

The first face of the damper 74 is bonded to the side walls 55 and the partition wall 59 with the adhesive 75, and the second face of the damper 74 is bonded to the side walls 65 and the partition wall 69 with the adhesive 76.

Figure 4:
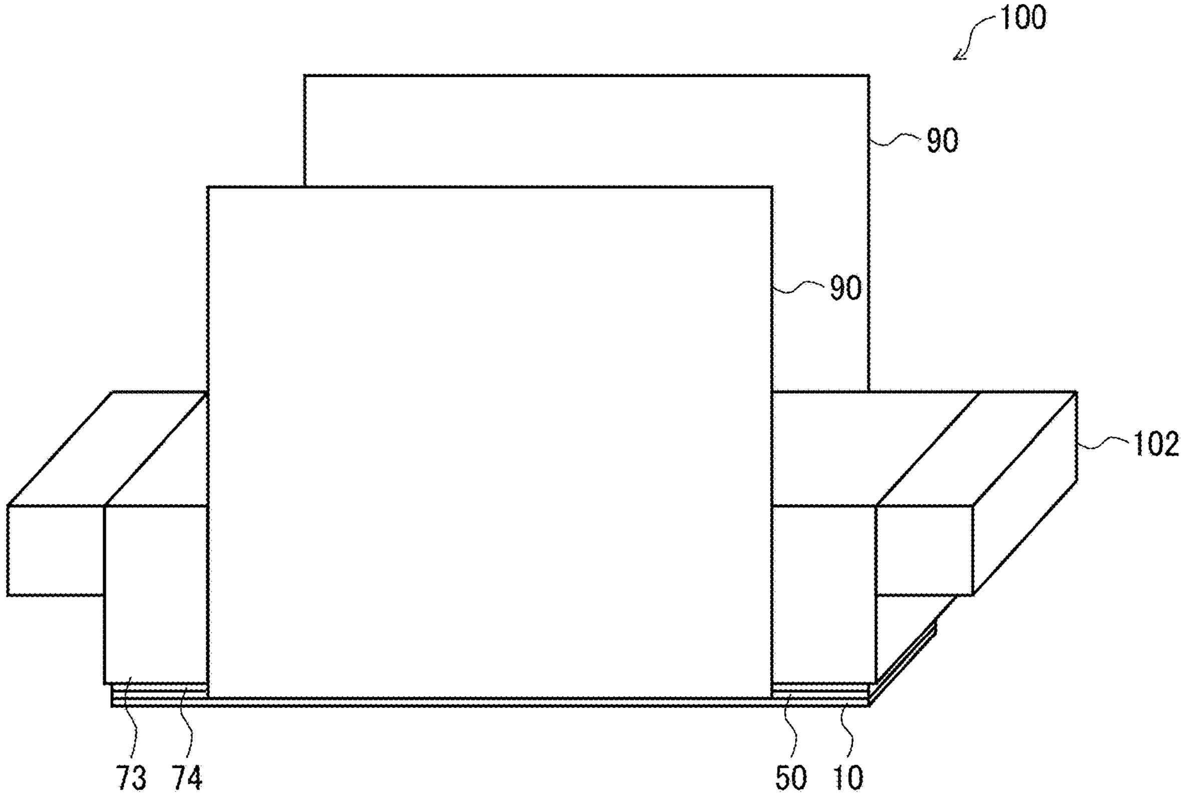
FIG. 4 is a schematic perspective view of a liquid discharge device according to a comparative example.
Figure 5:
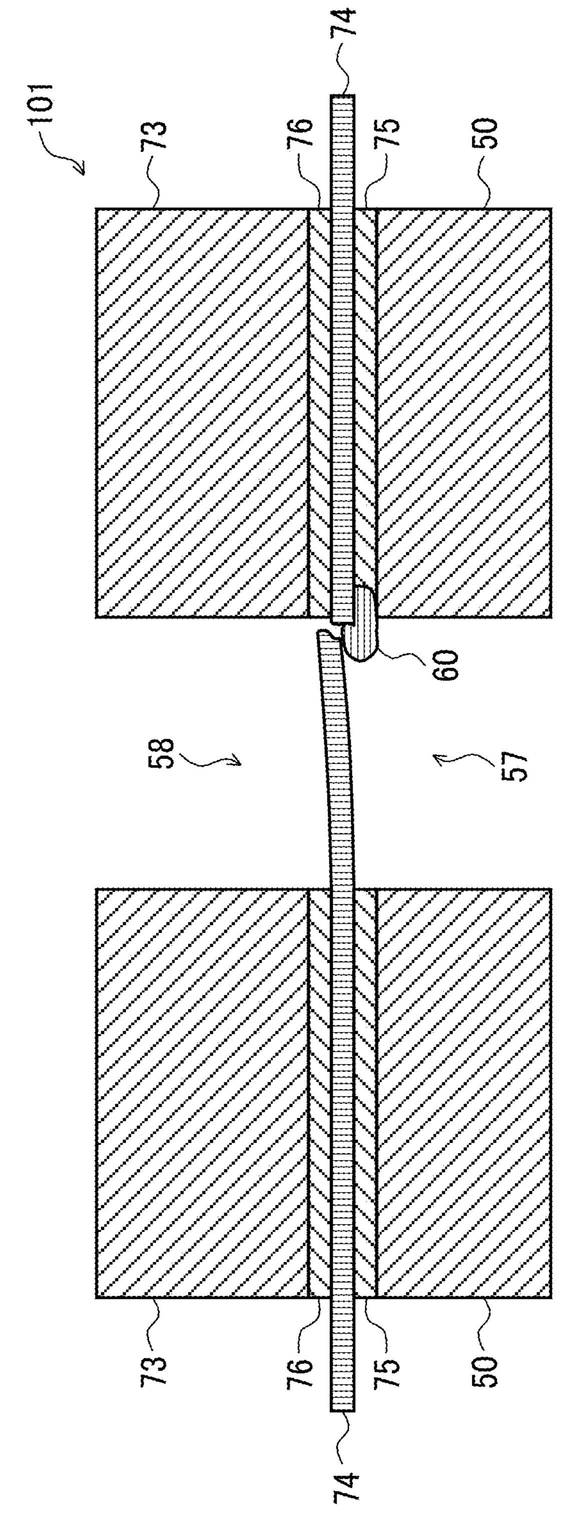
FIG. 5 is a schematic cross-sectional view of a damper holding substrate, a damper, and a piezoelectric element holding substrate of a liquid discharge head according to a comparative example, with a foreign substance caught in the bonded interface between the piezoelectric element holding substrate and the damper.

FIG. 4 is a schematic perspective view of the liquid discharge device 100. FIG. 5 is a schematic cross-sectional view of the damper holding substrate 73, the damper 74, and the piezoelectric element holding substrate 50 of the liquid discharge head 101, illustrating the bonded interface between the damper holding substrate 73 and the damper 74, and the bonded interface between the piezoelectric element holding substrate 50 and the damper 74. In the configuration illustrated in FIG. 4, the liquid discharge device 100 includes the nozzle plate 10, the piezoelectric element holding substrate 50, the damper 74, and the damper holding substrate 73 as described above.

FIG. 5 illustrates a cross section of the structure of chambers of the liquid discharge head 101. A liquid chamber region 57 (e.g., the supply-side common channel 71 or the collection-side common channel 72) is formed in the piezoelectric element holding substrate 50. Anon-liquid chamber region 58 (e.g., the second side space 67 and the second side space 68) is formed in the damper holding substrate 73. The damper 74 can be displaced in the non-liquid chamber region 58 to reduce pressure fluctuation of the liquid chamber region 57.

When the damper 74 and the piezoelectric element holding substrate 50, and the damper 74 and the damper holding substrate 73 are bonded, the adhesive 75 and the adhesive 76 are applied to the respective substrates as described above, and the adhesive 75 and the adhesive 76 are heated and cured while the substrates are pressed from above and below. At this time, a foreign substance from the environs or a silicon piece of the substrate may be caught in the bonded interface between the substrates while the adhesive 75 and the adhesive 76 are applied and pressed. If a foreign substance 60 is caught at an edge of the piezoelectric element holding substrate 50 as illustrated in FIG. 5, a local stress acts on the damper 74. As a result, the damper 74 may be damaged, and the liquid chamber region 57 and the non-liquid chamber region 58 may communicate with each other, causing the leakage from channels. In the example illustrated in FIG. 5, the foreign substance 60 is caught between the damper 74 and the piezoelectric element holding substrate 50. The same situation may be caused by a foreign substance 60 caught between the damper 74 and the damper holding substrate 73.

Embodiments of the present disclosure for solving the above situation are described below.

Figure 6:
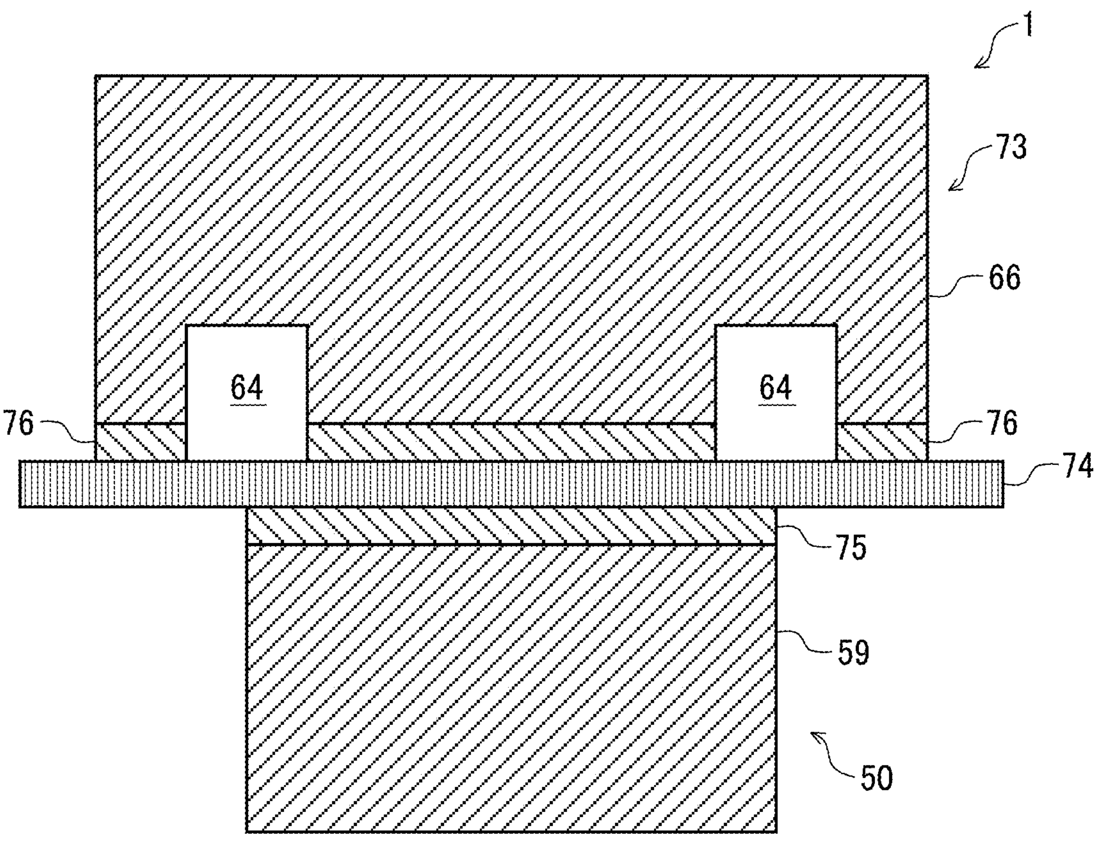
FIG. 6 is an enlarged view of a bonded portion at the center of a liquid discharge head according to a first embodiment of the present disclosure.

FIG. 6 is an enlarged view of the bonded portion between the partition wall 59 of the piezoelectric element holding substrate 50, the damper 74, and a partition wall 66 of the damper holding substrate 73 at the center of a liquid discharge head 1 according to a first embodiment of the present disclosure. The liquid discharge head 1 is different from the above-described liquid discharge head 101 in that the liquid discharge head 1 includes the partition wall 66 as the second partition instead of the partition wall 69. The other configurations are the same as that of the liquid discharge head 101.

The partition wall 66 separates the second side spaces 67 and 68 similarly to the partition wall 69, and the width of the partition wall 66 is wider than the width of the partition wall 59. The partition wall 66 is fixed to the damper 74 with the adhesive 76. The partition wall 66 has two openings 64 formed at positions opposed to both ends of the partition wall 59.

The opening 64 may be formed at any position as long as the end of the partition wall 59 of the piezoelectric element holding substrate 50 is disposed within the range of the opening 64 in the width direction, but the opening 64 is preferably formed such that the end of the partition wall 59 of the piezoelectric element holding substrate 50 is located at the center of the opening 64 in the width direction.

The width of the opening 64 is determined based on the size of the foreign substance 60 to be expected. When the size of the foreign substance 60 to be expected is about 50 m, which is difficult to visually recognize through visual inspection, both the width and the depth of the opening 64 are preferably about 50 μm. Preferably, the bonded width of the partition wall 66 with the damper 74 outside the opening 64 in the width direction at each end of the partition wall 66 is 20 μm or more to obtain sufficient sealing performance.

Figure 7:
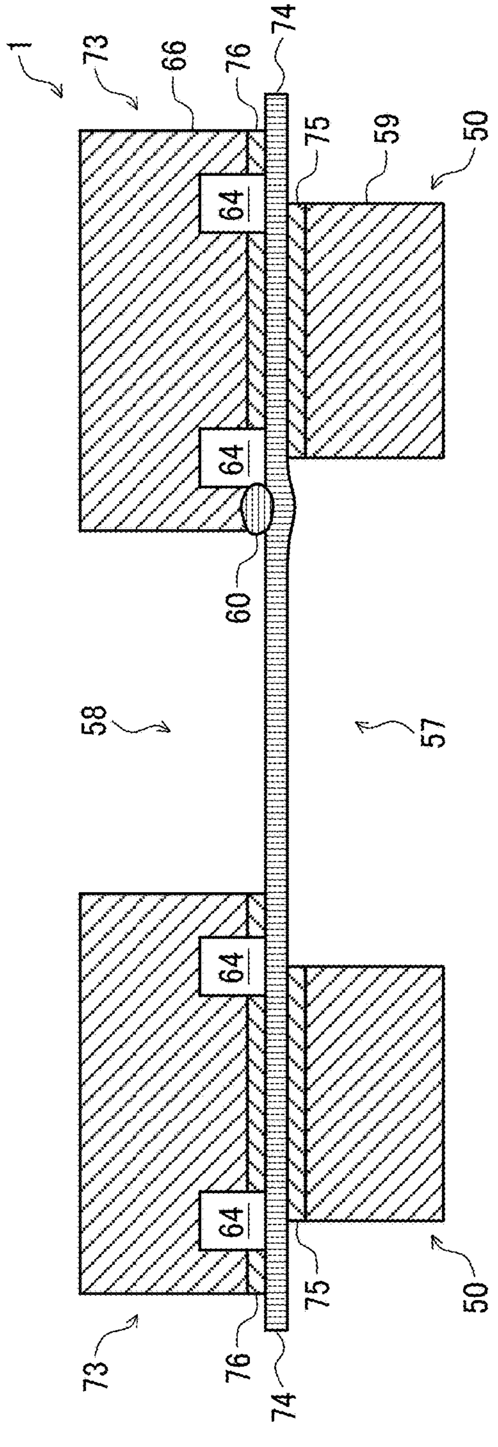
FIG. 7 is a schematic cross-sectional view of a damper holding substrate, a damper, and a piezoelectric element holding substrate of the liquid discharge head according to the first embodiment, with a foreign substance caught in the bonded interface between the damper holding substrate and the damper.

FIG. 7 illustrates the foreign substance 60 caught between the damper 74 and the damper holding substrate 73 in the liquid discharge head 1. A portion of the illustration on the left side in FIG. 7 indicates side walls having the same configuration as the partition walls 59 and 66, or may indicate other partition walls. In FIG. 7, the foreign substance 60 is positioned in the region where the piezoelectric element holding substrate 50 is not disposed in the width direction. Accordingly, the damper 74 does not receive a reaction force from the piezoelectric element holding substrate 50 even when the foreign substance 60 is pressed against the damper 74. As a result, the damage to the damper 74 and the leakage from channels are prevented.

Figure 8:
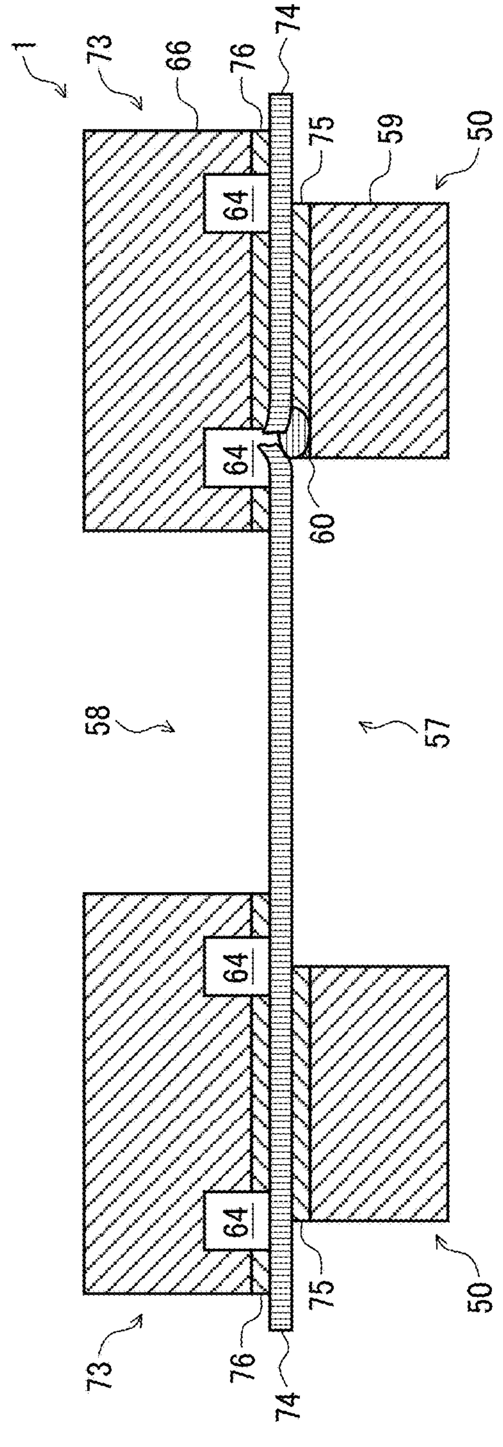
FIG. 8 is a schematic cross-sectional view of the damper holding substrate, the damper damaged by a foreign substance, and the piezoelectric element holding substrate of the liquid discharge head according to the first embodiment, with the foreign substance caught in the bonded interface between the piezoelectric element holding substrate and the damper.

FIG. 8 illustrates the foreign substance 60 caught between the damper 74 and the piezoelectric element holding substrate 50 in the liquid discharge head 1. A portion of the illustration on the left side in FIG. 8 indicates side walls having the same configuration as the partition walls 59 and 66, or may indicate other partition walls. If the foreign substance 60 is caught at this position, the damper 74 receives a reaction force from the piezoelectric element holding substrate 50 when the foreign substance 60 is pressed against the damper 74, and thus the damper 74 may be damaged. However, in this configuration, even if the damper 74 is damaged as illustrated in FIG. 8, the damaged portion of the damper 74 is within the opening 64 in the width direction, and the liquid chamber region 57 and the non-liquid chamber region 58 do not communicate with each other, and thus, the leakage from channels does not occur. The liquid chamber region 57 and the opening 64 communicate with each other, but since a liquid contact film is applied to the wall of the opening 64, even if ink contacts the wall of the opening 64, a problem does not occur.

In the liquid discharge head 1 according to the above-described embodiment of the present disclosure, the width of the partition wall 66 is larger than the width of the partition wall 59, and the partition wall 66 has the openings 64 opposed to both ends of the partition wall 59 in the width direction. With this configuration, even if the foreign substance 60 is caught between the damper 74 and the damper holding substrate 73, the damper 74 does not receive a reaction force from the piezoelectric element holding substrate 50 even when the foreign substance 60 is pressed against the damper 74, and thus the damage to the damper 74 and the leakage from channels are prevented. If the foreign substance 60 is caught between the damper 74 and the piezoelectric element holding substrate 50, the damper 74 may be damaged. However, the damaged portion of the damper 74 is within the opening 64 in the width direction, and the liquid chamber region 57 and the non-liquid chamber region 58 do not communicate with each other, and thus, the leakage from channels is prevented.

Figure 9:
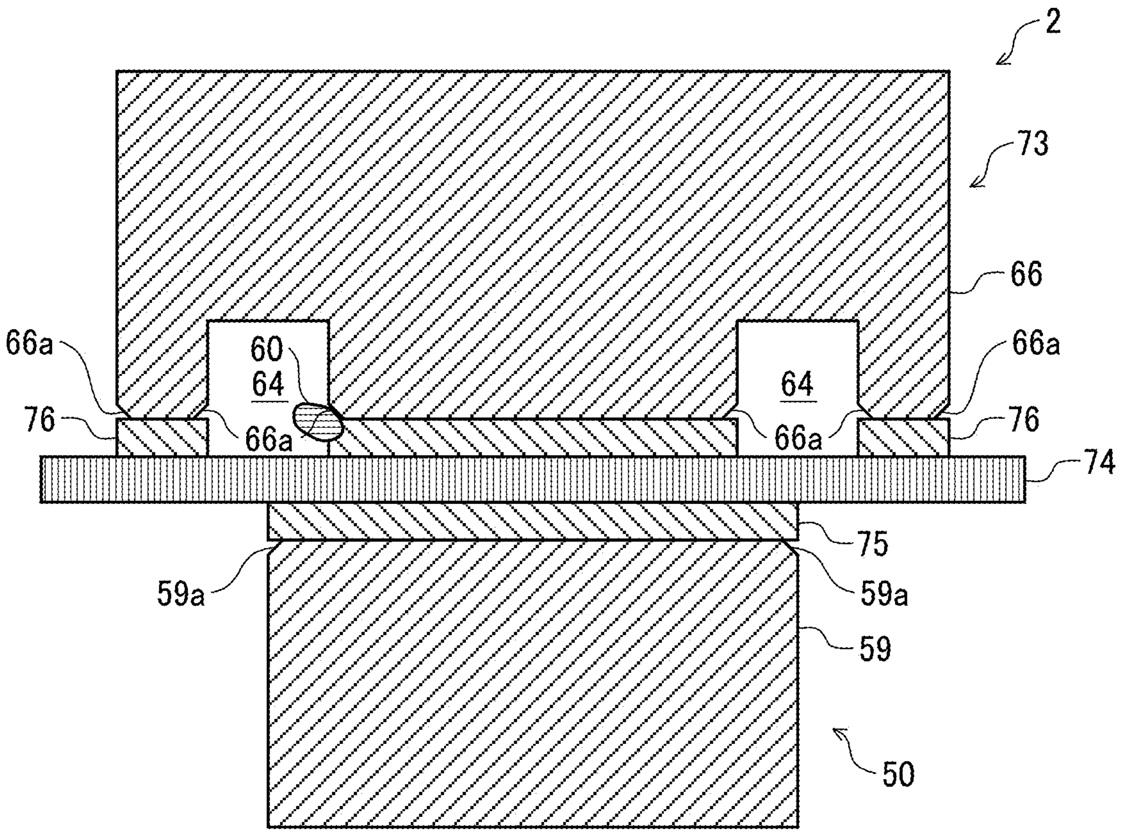
FIG. 9 is an enlarged view of a bonded portion at the center of a liquid discharge head according to a second embodiment of the present disclosure.

A liquid discharge head 2 according to a second embodiment of the present disclosure is described below. The liquid discharge head 2 is different from the liquid discharge head 1 in that the partition wall 59 has chamfered portions **59*a* and the partition wall 66 has chamfered portion 66*a*. As illustrated in FIG. 9, edges of the partition wall 59, which are in contact with the damper 74, at both ends are chamfered, and edges of the partition wall 66, which are in contact with the damper 74, at both ends and at positions adjacent to the openings 64** are chamfered. The other configurations are the same.

According to the second embodiment, the foreign substance 60 caught between the damper 74 and the damper holding substrate 73 is likely to be moved to the opening 64 as illustrated in FIG. 9 while being pressed, and thus the possibility of the damage to the damper 74 can be reduced. In the second embodiment, the widths of the chamfered portions **59*a* and 66*a* are preferably about several m to have a sufficient bonded width between the damper 74 and the partition wall 59 or 66. Instead of the flat chamfering (C chamfering) illustrated in FIG. 9**, curved chamfering (R chamfering) may be performed.

Figure 10B:
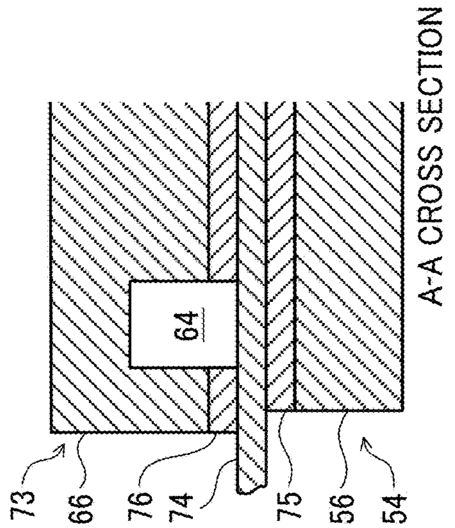
FIG. 10B is a cross-sectional view of the bonded portion taken along line A-A in FIG. 10A.
Figure 10C:
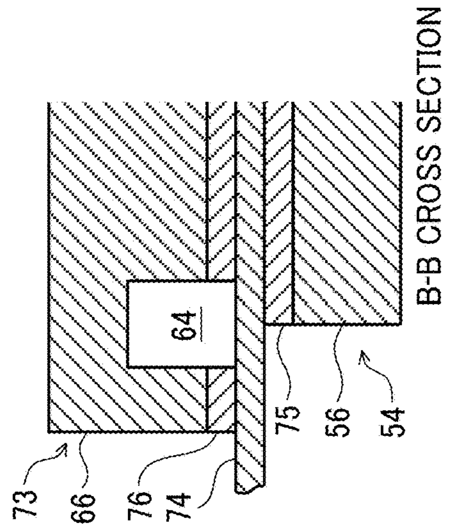
FIG. 10C is a cross-sectional view of the bonded portion taken along line B-B in FIG. 10A.
Figure 10A:
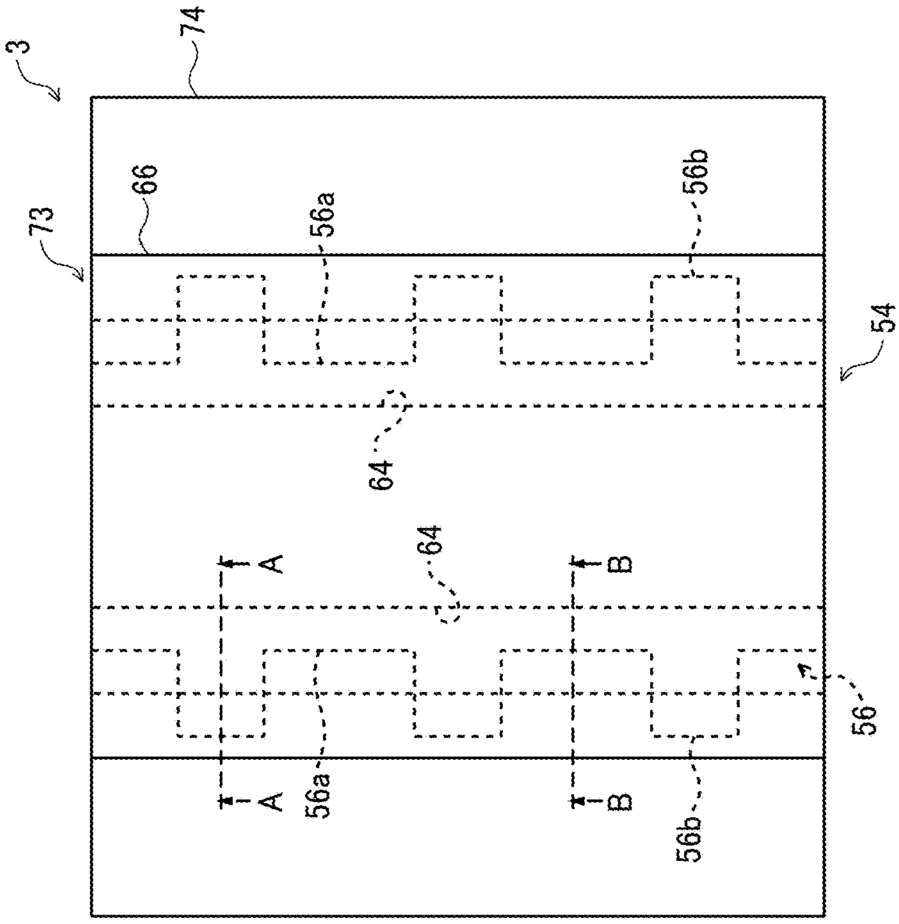
FIG. 10A is a plan view of a bonded portion at the center of a liquid discharge head according to a third embodiment of the present disclosure.

A liquid discharge head 3 according to a third embodiment of the present disclosure is described below. The liquid discharge head 3 is different from the liquid discharge head 1 in that a piezoelectric element holding substrate 54 is used instead of the piezoelectric element holding substrate 50 as illustrated in FIGS. 10A to 10C, and the other configurations are the same.

Similarly to the piezoelectric element holding substrate 50, the piezoelectric element holding substrate 54 includes a partition wall 56 as the first partition that separates the supply-side common channel 71 and the collection-side common channel 72. The damper 74 vibrates in the supply-side common channel 71 and the collection-side common channel 72 which are referred to as the first side spaces. The partition wall 56 has recesses **56*a* as illustrated in FIGS. 10A and 10C and projections 56*b* as illustrated in FIGS. 10A and 10B at both ends in the width direction. The recesses 56*a* and the projections 56*b* are alternately arranged in a longitudinal direction orthogonal to the width direction and the bonding direction at the both ends of the partition wall 56 in the width direction. Both ends of the projections 56*b* are disposed outside the openings 64 and inside both ends of the partition wall 66 in the width direction. Both ends of the recesses 56*a* are disposed within ranges of the openings 64** in the width direction, respectively.

According to the third embodiment, the possibility of the damage to the damper 74 may increase, for example, when a foreign substance 60 is caught between the projection **56*b* and the damper 74. However, the piezoelectric element holding substrate 54 has a larger bonded area than the piezoelectric element holding substrate 50**. As a result, the overall bonding strength can be increased.

In the above-described embodiments, the damper 74 has a compliance of $7\times10^{-17}$ $m^3$/Pa or more, Young's modulus of 3 to 200 GPa, and a thickness of 2 to 10 μm. When the compliance of the damper 74 is $7\times10^{-17}$ $m^3$/Pa or more, the damper 74 can be deformed (bent) according to the pressure of the liquid to dampen impact or amplitude of vibration due to the pressure of the liquid. When Young's modulus of the damper 74 is smaller than 3 GPa, the damper 74 is likely to be damaged by the pressure of the liquid. When Young's modulus of the damper 74 is larger than 200 GPa, the damper 74 is unlikely to be deformed by the pressure of the liquid. As a result, the damper 74 may not dampen the vibration due to the pressure of the liquid. When the thickness of the damper 74 is smaller than 2 μm, the strength of the damper 74 may decrease. As a result, the damper 74 is likely to be damaged by the pressure of the liquid. When the thickness of the damper 74 is larger than 10 μm, the damper 74 may not dampen the vibration due to the pressure of the liquid.

Figure 17:
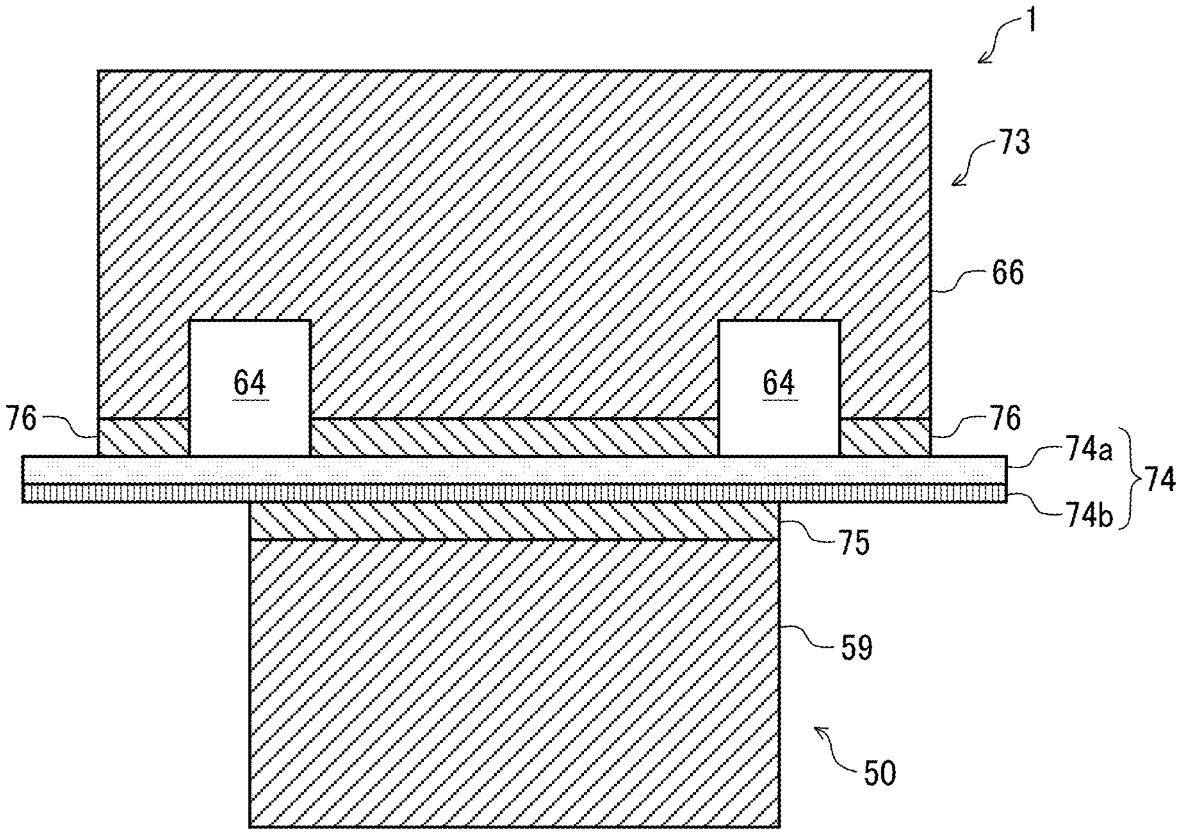
FIG. 17 is another enlarged view of a bonded portion at the center of the liquid discharge head according to the first embodiment.

The compliance C ($m^3$/Pa) can be expressed by $C=\Delta W/\Delta P$ based on a volume change $\Delta W$ ($m^3$) of the supply-side common channel 71 and the collection-side common channel 72 generated by the deformation of the damper 74 when a pressure change $\Delta P$ (Pa) is received from the liquid in the supply-side common channel 71 and the collection-side common channel 72 which are referred to as the first side spaces of the damper 74. The damper 74 having such properties can dissipate vibration energy to dampen impact or amplitude of vibration. The damper may have a laminated structure including multiple layers. Since the damper 74 has the laminated structure including the multiple layers (i.e., a lamination of multiple layers) in the bonding direction, the compliance can be changed as desired by adjusting the physical properties (e.g., Young's modulus and Poisson's ratio) or the thickness of the damper 74 formed by film formation. FIG. 17 illustrates a damper 74 having a laminated structure including two layers. As illustrated in FIG. 17, the damper 74 includes a layer 74*a* adjacent to the damper holding substrate 73 and a layer 74*b* adjacent to the piezoelectric element substrate 50, which are laminated in the bonding direction. The material and thickness of the layer 74*a* and the layer 74*b* are adjusted to adjust the compliance C, Young's modulus E, and the thickness t of the damper 74 within the above-described range. For example, the layer 74*b* is made of a material with high liquid resistance, which means that the layer 74*b* is not dissolved or corroded by the liquid, and the layer 74*a* is made of a material with low Young's modulus. Due to such a laminated structure, the surface of the damper 74 contacting the liquid has high liquid resistance, and the damper 74 has low Young's modulus. Thus, the damper 74 can achieve both the high liquid resistance and high compliance.

The compliance C ($m^3$/Pa) of the damper 74 can be calculated by the following Equation (1) based on the Poisson's ratio v and the Young's modulus E (Pa) of the material of the damper 74 and the thickness t (m), the width w (m), and the length l (m) of the vibratable flexible region of the damper 74.

$$C = \frac{1-V^2}{60E}\cdot\frac{w^5 l}{t^3} \quad (1)$$

When the damper 74 has multiple vibratable flexible regions, the compliance of the damper 74 can be obtained as the sum of the compliances of the respective vibratable flexible regions.

A liquid discharge apparatus including the above-described liquid discharge head 1, 2, or 3 is described below.

Figure 11:
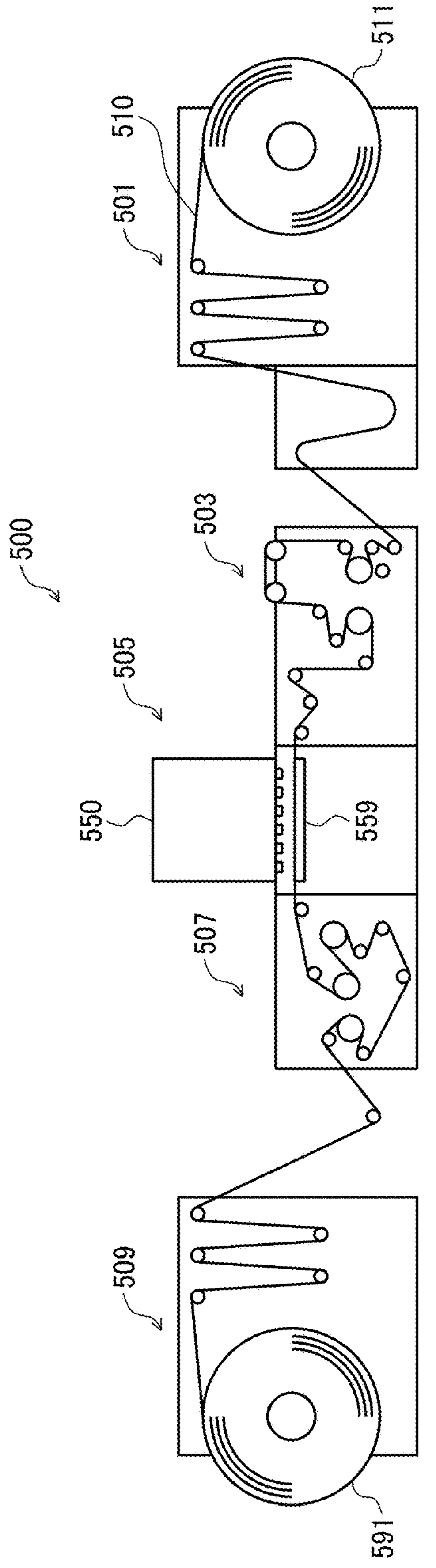
FIG. 11 is a schematic front view of a liquid discharge apparatus including the liquid discharge head according to embodiments of the present disclosure.
Figure 12:
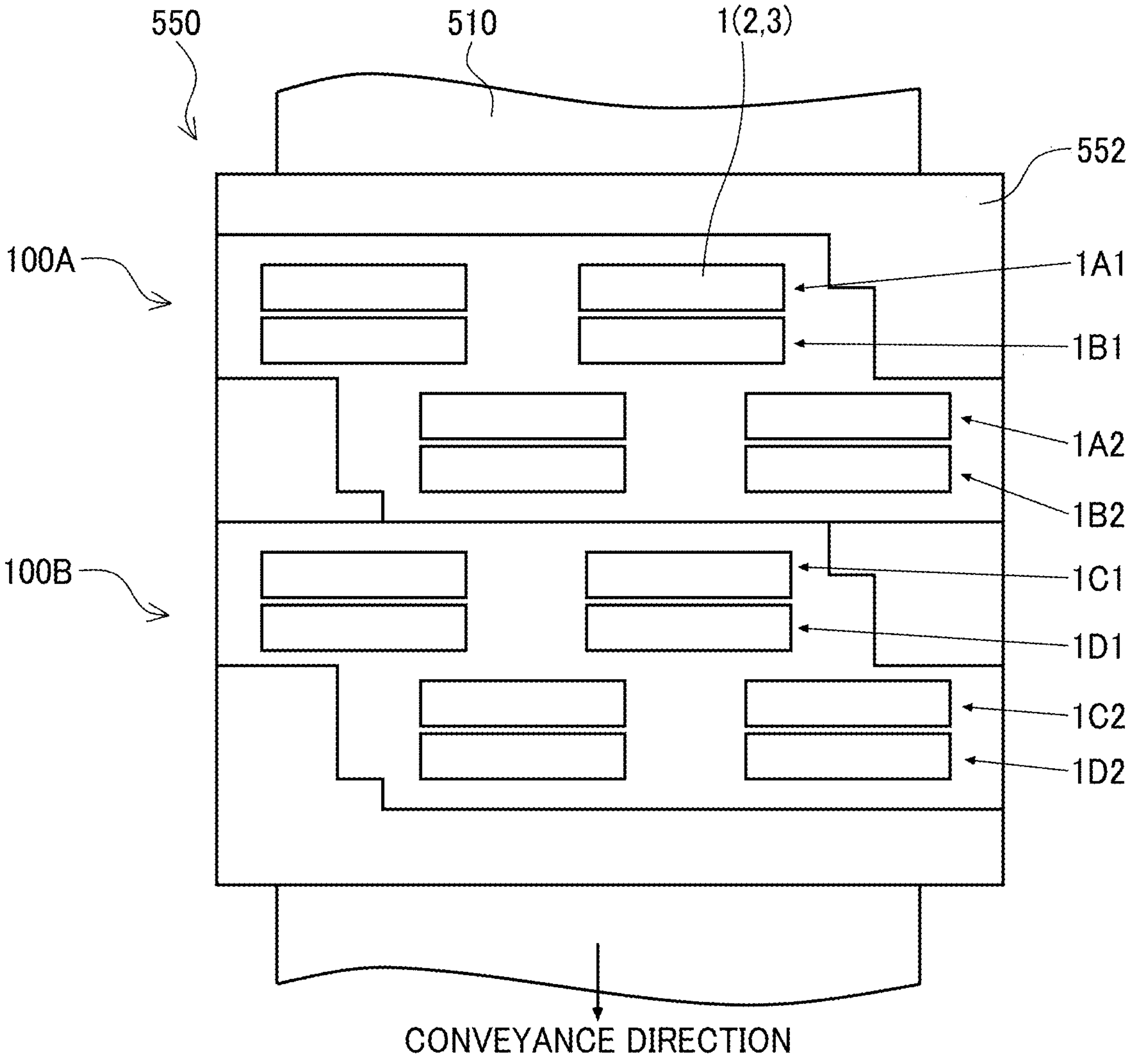
FIG. 12 is a schematic plan view of a liquid discharge device of the liquid discharge apparatus including the liquid discharge head according to embodiments of the present disclosure.

As illustrated in FIGS. 11 and 12, a printer 500 serving as the liquid discharge apparatus includes a feeder 501 to feed a continuous medium 510 as a recording medium, a guide conveyor 503 to guide and convey the continuous medium 510, fed from the feeder 501, to a printing unit 505. The printer 500 further includes the printing unit 505 to discharge a liquid onto the continuous medium 510 to form an image on the continuous medium 510, a dryer 507 to dry the continuous medium 510 to which the liquid adheres, and a carrier 509 to feed the dried continuous medium 510 outward.

The continuous medium 510 is fed from a winding roller 511 of the feeder 501, guided and conveyed with rollers of the feeder 501, the guide conveyor 503, the dryer 507, and the carrier 509, and wound around a take-up roller 591 of the carrier 509. These rollers serve as a conveyor to convey the continuous medium 510.

In the printing unit 505, the continuous medium 510 is conveyed on a conveyance guide 559 so as to face a head unit 550 as a liquid discharge device. The head unit 550 discharges a liquid onto the continuous medium 510 to print an image.

The printer 500 includes liquid discharge devices 100A and 100B, which are similar to the above-described liquid discharge device 100, in the head unit 550. The liquid discharge devices 100A and 100B are mounted on a common base 552.

The liquid discharge device 100A includes head arrays 1A1, 1B1, 1A2, and 1B2. Each of the head arrays 1A1, 1B1, 1A2, and 1B2 includes multiple liquid discharge heads 1 arranged in a head array direction perpendicular to a conveyance direction of the continuous medium 510. The liquid discharge device 100B includes head arrays 1C1, 1D1, 1C2, and 1D2. Each of the head arrays 1C1, 1D1, 1C2, and 1D2 includes multiple liquid discharge heads 1 arranged in the head array direction perpendicular to the conveyance direction of the continuous medium 510. The head arrays 1A1 and 1A2 of the liquid discharge device 100A discharge liquid of the same color. Similarly, the head arrays 1B1 and 1B2 of the liquid discharge device 100A are grouped as one set and discharge liquid of the same desired color. The head arrays 1C1 and 1C2 of the liquid discharge device 100B are grouped as one set and discharge liquid of the same desired color. The head arrays 1D1 and 1D2 of the liquid discharge device 100B are grouped as one set and discharge liquid of the same desired color.

Figure 13:
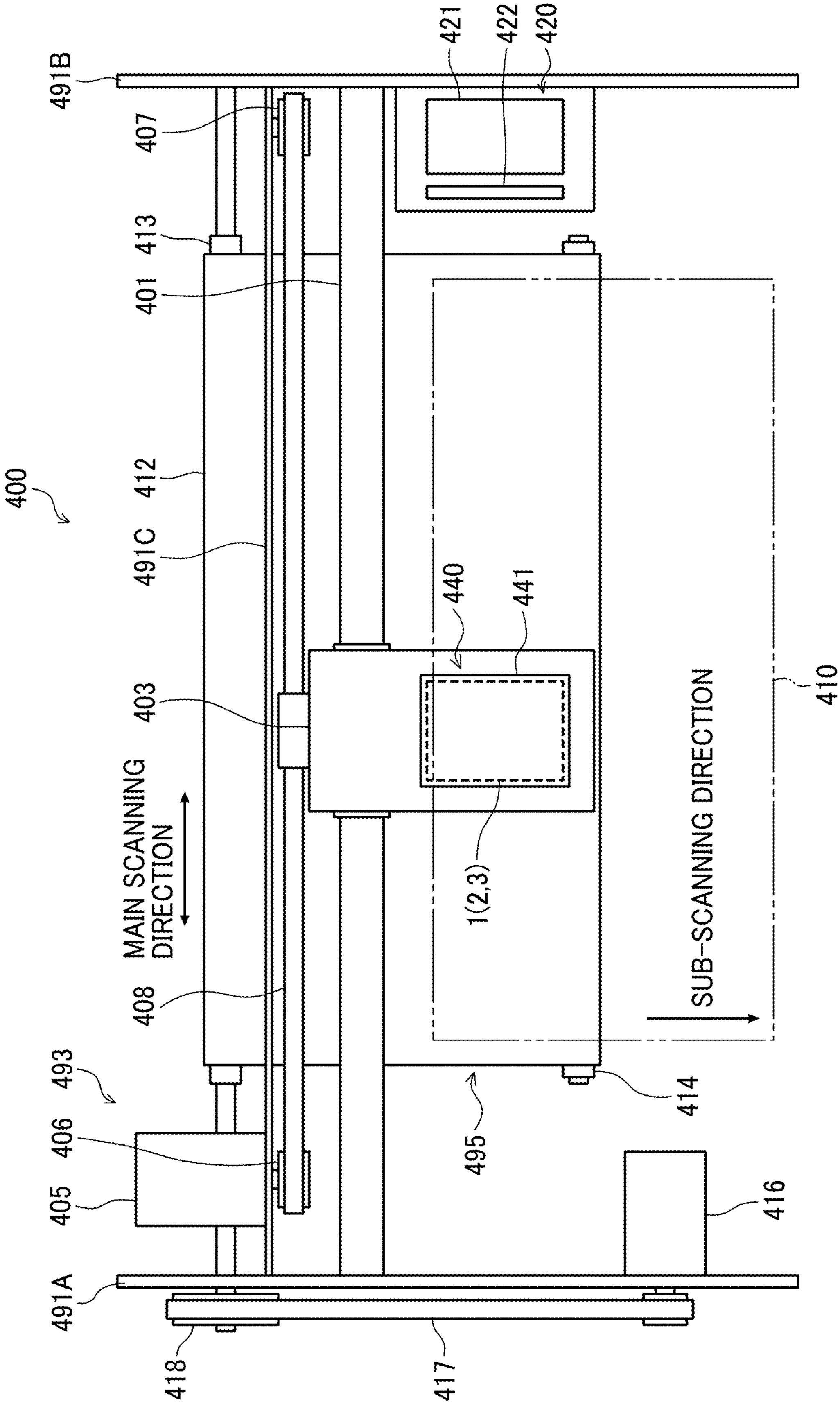
FIG. 13 is a schematic plan view of another liquid discharge apparatus including the liquid discharge head according to embodiments of the present disclosure.
Figure 14:
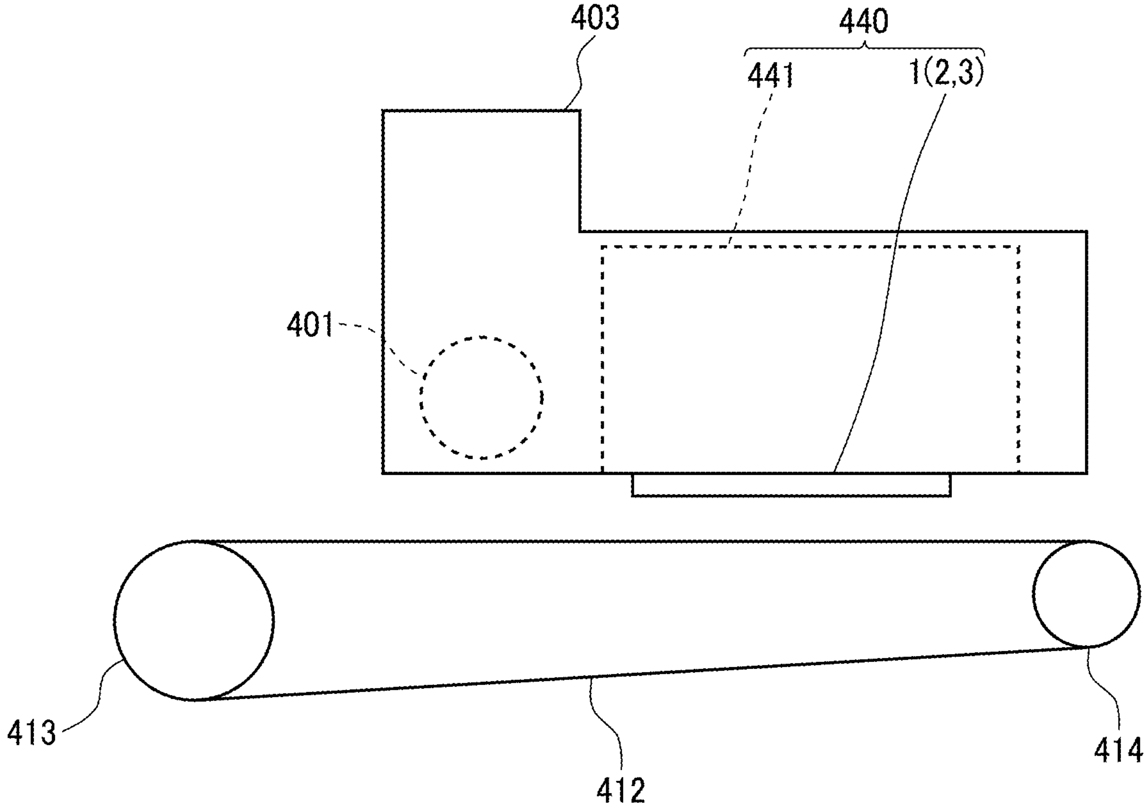
FIG. 14 is a schematic side view of the liquid discharge apparatus of FIG. 13, including the liquid discharge head according to embodiments of the present disclosure.

Another printer 400 as a liquid discharge apparatus according to the present embodiment is described below with reference to FIGS. 13 and 14.

As the liquid discharge apparatus, the printer 400 is a serial type printing apparatus, and a main-scanning moving mechanism 493 reciprocally moves a carriage 403 in a main scanning direction. The main-scanning moving mechanism 493 includes a guide 401, a main scanning motor 405, and a timing belt 408. The guide 401 is bridged between left and right side plates 491A and 491B to movably hold the carriage 403. The carriage 403 is reciprocally moved in the main scanning direction by driving force of the main scanning motor 405 transmitted via the timing belt 408 looped around a drive pulley 406 and a driven pulley 407.

The carriage 403 mounts a liquid discharge device 440 including the liquid discharge head 1 and a head tank 441 as a single integrated unit. The liquid discharge head 1 discharges color liquid of, for example, yellow (Y), cyan (C), magenta (M), and black (K). The liquid discharge head 1 is mounted on the liquid discharge device 440 such that a nozzle row including the multiple nozzles 11 is arranged in a sub-scanning direction perpendicular to the main scanning direction. The liquid discharge head 1 discharges the color liquid downward from the multiple nozzles 11. The liquid discharge head 1 is coupled to a liquid circulation device so that a liquid of a desired color is circulated and supplied to the liquid discharge head 1.

The printer 400 includes a conveyance mechanism 495 to convey a sheet 410 as the recording medium. The conveyance mechanism 495 includes a conveyance belt 412 as a conveyor and a sub-scanning motor 416 to drive the conveyance belt 412. The conveyance belt 412, which is an endless belt, is stretched between a conveyance roller 413 and a tension roller 414, and conveys the sheet 410 at a position facing the liquid discharge head 1 while attracting the sheet 410. The sheet 410 can be attracted to the conveyance belt 412 by, for example, electrostatic attraction or air suction. The conveyance belt 412 is circumferentially moved in the sub-scanning direction by driving force of the sub-scanning motor 416 transmitted via a timing belt 417 and a timing pulley 418.

On one end of the range of movement of the carriage 403 in the main scanning direction, a maintenance mechanism 420 that maintains and recovers the liquid discharge head 1 is disposed lateral to the conveyance belt 412. The maintenance mechanism 420 includes, for example, a cap 421 to cap a nozzle face (i.e., a face on which the multiple nozzles 11 are formed) of the liquid discharge head 1 and a wiper 422 to wipe the nozzle face. The main-scanning moving mechanism 493, the maintenance mechanism 420, and the conveyance mechanism 495 are mounted onto a housing including the side plates 491A and 491B and a back plate 491C.

In the printer 400 having the above-described configuration, the sheet 410 is attracted on the conveyance belt 412 and conveyed in the sub-scanning direction by the circumferential movement of the conveyance belt 412. The liquid discharge head 1 is driven in response to an image signal while the carriage 403 moves in the main scanning direction to discharge a liquid onto the sheet 410 not in motion. As a result, an image is formed on the sheet 410.

Figure 15:
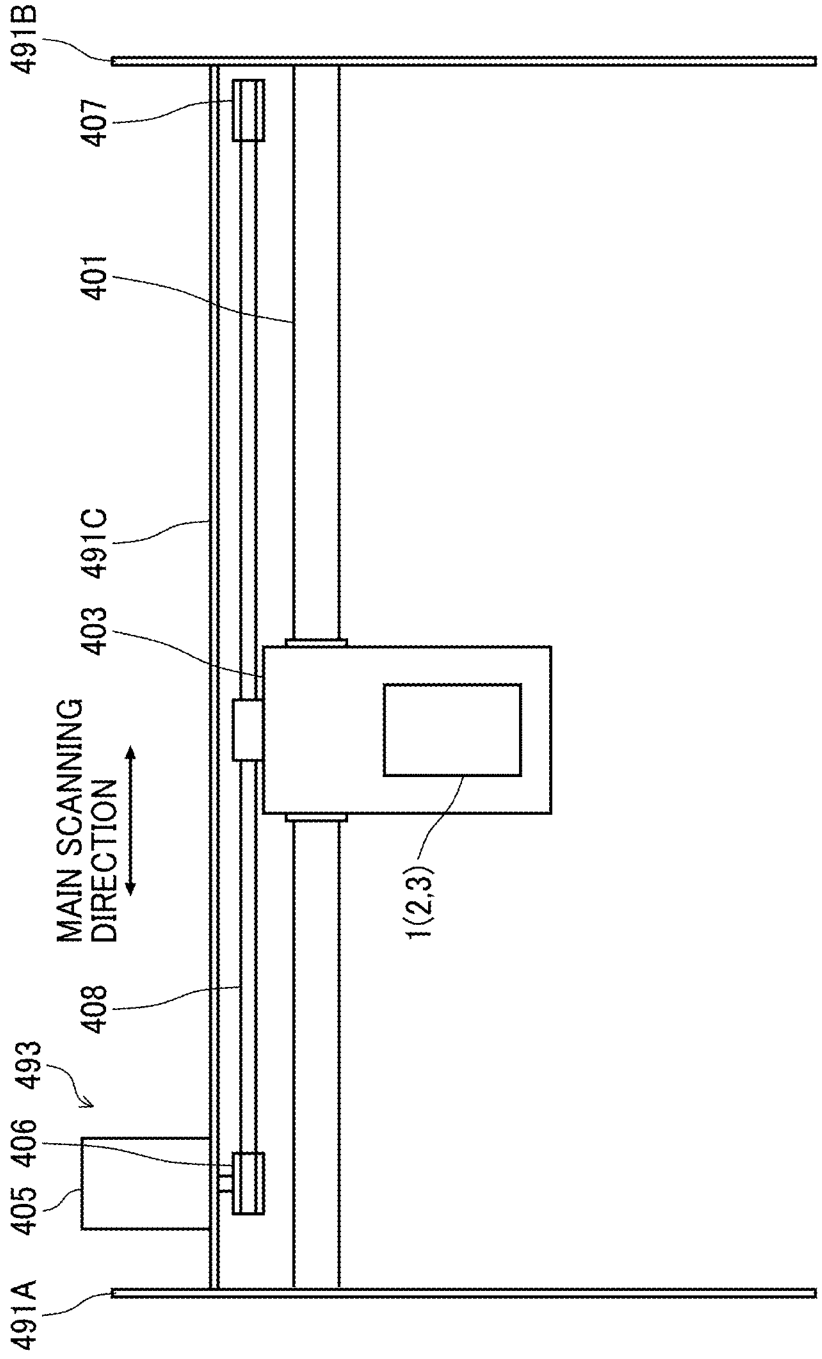
FIG. 15 is a schematic plan view of a liquid discharge device of another liquid discharge apparatus including the liquid discharge head according to embodiments of the present disclosure.

The above-described liquid discharge device 440 is described below with reference to FIG. 15.

The liquid discharge device 440 includes the housing, the main-scanning moving mechanism 493, the carriage 403, and the liquid discharge head 1 among components of the printer 400 as the liquid discharge apparatus. The side plates 491A and 491B, and the back plate 491C construct the housing.

In the liquid discharge device 440, the maintenance mechanism 420 described above may be mounted on, for example, the side plate 491B.

Another liquid discharge device 450 according to the embodiments of the present disclosure is described below with reference to FIG. 16.

Figure 16:
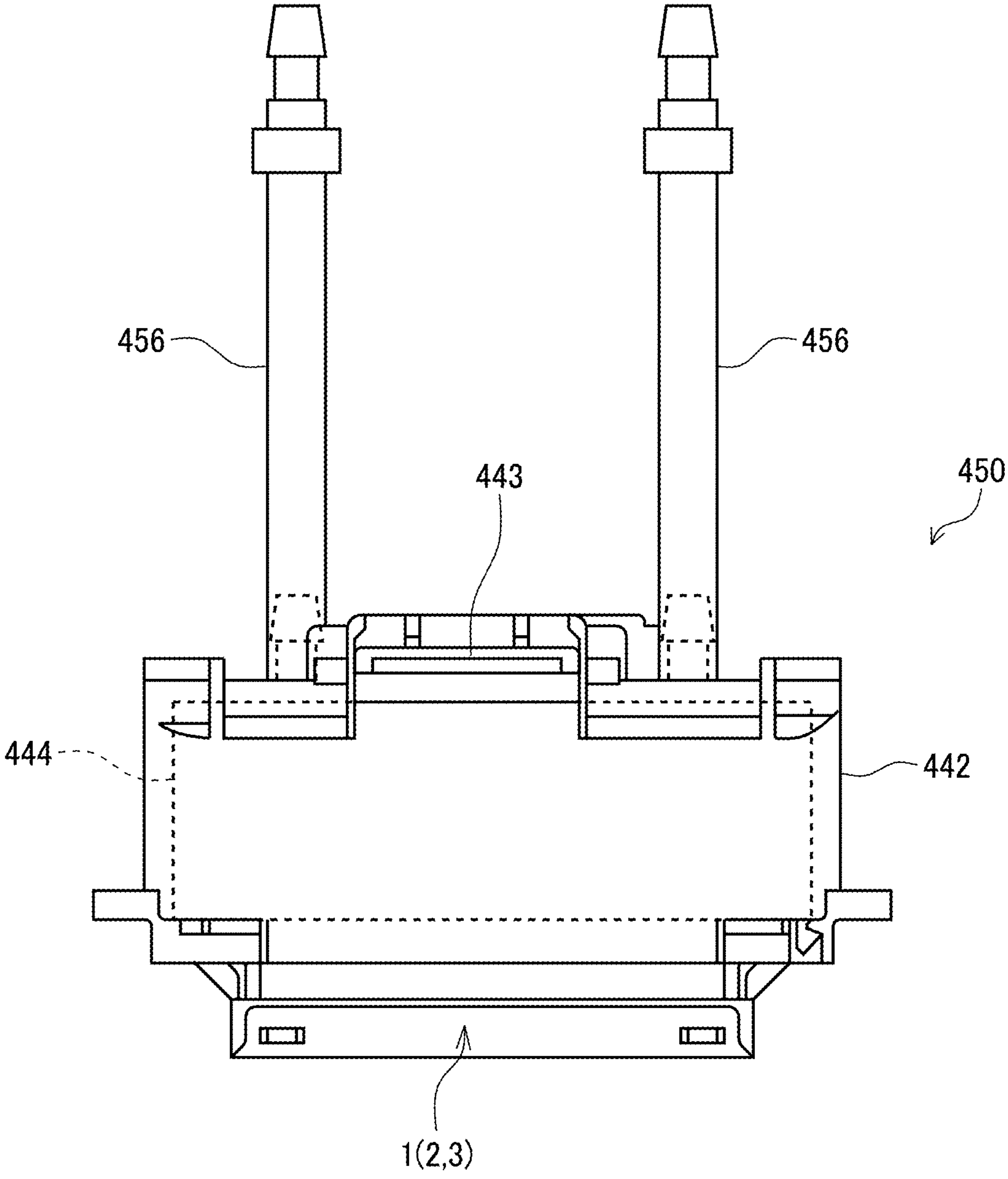
FIG. 16 is a schematic front view of another liquid discharge device of another liquid discharge apparatus including the liquid discharge head according to embodiments of the present disclosure.

The liquid discharge device 450 illustrated in FIG. 16 includes the liquid discharge head 1 to which a channel component 444 is attached, and a tube 456 connected to the channel component 444. The channel component 444 is disposed inside a cover 442, and a connector 443 for electrically connecting to the liquid discharge head 1 is provided on an upper portion of the channel component 444. In some embodiments, the liquid discharge device 440 may include the head tank 441 instead of the channel component 444.

Each of the liquid discharge devices 100, 100A, 100B, 440, 450, and 550 and each of the printers 400 and 500 as the liquid discharge apparatus, which includes the liquid discharge head 1 described above, can attain the same operational effects as the operational effects of the liquid discharge head 1 described above. Although the liquid discharge head 1 is used in each of the above-described configurations, the liquid discharge head 2 or the liquid discharge head 3 may be used instead of the liquid discharge head 1. In this case, the same operational effects as those of the liquid discharge head 2 or 3 can be attained.

In the present disclosure, the liquid to be used is not limited to a particular liquid as long as the liquid has a viscosity or surface tension to be discharged from a head (liquid discharge head). However, preferably, the viscosity of the liquid is not greater than 30 millipascal-second (mPa s) under ordinary temperature and ordinary pressure or by heating or cooling. Examples of the liquid include a solution, a suspension, or an emulsion that contains, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., inkjet ink, surface treatment solution, or a material solution for three-dimensional fabrication.

Examples of an energy source for generating energy to discharge liquid include a piezoelectric actuator (a laminated piezoelectric element or a thin-film piezoelectric element), a thermal actuator that employs a thermoelectric transducer, such as a thermal resistor, and an electrostatic actuator including a diaphragm and opposed electrodes.

The "liquid discharge head" is not limited in the type of pressure generator used. In addition to the above-described piezoelectric actuator (which may use a laminated piezoelectric element), for example, a thermal actuator using a thermoelectric transducer such as a thermal resistor, and an electrostatic actuator including a diaphragm and a counter electrode can be used.

The "liquid discharge device" is an assembly of parts relating to liquid discharge. The term "liquid discharge device" represents a structure including the liquid discharge head and a functional part(s) or unit(s) combined with the liquid discharge head as a single unit. For example, the "liquid discharge device" includes a combination of the liquid discharge head with at least one of a head tank, a carriage, a supply mechanism, a maintenance mechanism, a main-scanning moving mechanism, and a liquid circulation device.

The above integration may be achieved by, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

The liquid discharge head and the head tank may be assembled, or the liquid discharge head and the head tank may be coupled (connected) to each other via, for example, a tube to form the liquid discharge device as a single unit. A unit including a filter may further be added to a portion between the head tank and the liquid discharge head of the liquid discharge device.

The liquid discharge device may be an integrated unit in which the liquid discharge head and the carriage are integrated as a single unit, or the liquid discharge head, the carriage, and the main-scanning moving mechanism are integrated as a single unit. As yet another example, the liquid discharge device is a unit in which the liquid discharge head and the main-scanning moving mechanism are combined into a single unit. The liquid discharge head is movably held by a guide that is a part of the main-scanning moving mechanism.

In still another example, the cap that forms a part of the maintenance mechanism is secured to the carriage mounting the liquid discharge head so that the liquid discharge head, the carriage, and the maintenance mechanism are integrated as a single unit to form the liquid discharge device. Further, in still yet another example, the liquid discharge device includes a tube connected to the liquid discharge head mounting the head tank or the channel component so that the liquid discharge head and the supply mechanism are integrated as a single unit. Through the tubes, the liquid in a liquid storage source is supplied to the liquid discharge head.

The main-scanning moving mechanism may be a guide only. The supply mechanism may be a tube(s) only or a loading unit only.

The "liquid discharge device" includes a head module including the above-described liquid discharge head, and a head unit with which the above-described functional components or mechanisms are combined to form a single unit.

The term "liquid discharge apparatus" used herein also represents an apparatus including the liquid discharge head, the liquid discharge device, the head module, or the head unit to drive the liquid discharge head to discharge liquid. The term "liquid discharge apparatus" used here includes, in addition to apparatuses to discharge liquid to a medium onto which liquid can adhere, apparatuses to discharge the liquid into gas (air) or liquid.

The "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a recording medium by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms patterns having no meaning or an apparatus that fabricates three-dimensional images.

The term "medium onto which liquid can adhere" described above represents a medium onto which liquid is at least temporarily adhered, a medium onto which liquid is adhered and fixed, or a material into which liquid adheres and permeates. Examples of the "medium onto which liquid can adhere" include recording media, such as paper sheet, recording paper, recording sheet of paper, film, and cloth, electronic components, such as electronic substrate and piezoelectric element, and media, such as powder layer, organ model, and testing cell. The "medium onto which liquid can adhere" includes any material to which liquid adheres, unless otherwise specified.

Examples of the "medium onto which liquid can adhere" include any materials to which liquid can adhere even temporarily, such as paper, thread, fiber, fabric, leather, metal, plastic, glass, wood, and ceramic.

The liquid discharge apparatus relatively moves the liquid discharge head and the medium onto which liquid can adhere. Which of the liquid discharge head or the medium onto which liquid can adhere is moved is not limited. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

Aspects of the present disclosure are, for example, as follows.

Aspect 1

The liquid discharge head includes a damper having flexibility, a damper holding substrate, and a piezoelectric element holding substrate. The damper is joined to the damper holding substrate. the damper holding substrate has a one side space in which the damper can vibrate. piezoelectric element holding substrate is joined to the damper on the side opposite to the damper holding substrate. The piezoelectric element holding substrate has a recess for accommodating a piezoelectric element and the other side space in which the damper can vibrate. The piezoelectric element holding substrate includes a first partition wall forming the other side space. The damper holding substrate includes a second partition wall forming the one side space and having a width larger than that of the first partition wall. The first partition wall and the second partition wall are opposed to each other via the damper. The second partition wall has openings formed corresponding to both ends of the first partition wall.

In other words, a liquid discharge head includes a piezoelectric element, a flexible damper, a first holding substrate, and a second holding substrate. The flexible damper has a first face and a second face opposite to the first face. The first holding substrate is bonded to the first face of the flexible damper in a bonding direction. The first holding substrate has a recess accommodating the piezoelectric element, a first partition having a first width in a width direction orthogonal to the bonding direction, and first side spaces partitioned by the first partition. The first side spaces face the first face of the flexible damper. The second holding substrate is bonded to the second face of the flexible damper in the bonding direction. The second holding substrate has a second partition opposed to the first partition via the flexible damper, second side spaces partitioned by the second partition, and openings at both ends of the first partition in the width direction. The openings are respectively opposed to the both ends of the first partition via the flexible damper. The second partition has a second width wider than the first width in the width direction. The second side spaces face the second face of the flexible damper.

Aspect 2

In the liquid discharge head according to Aspect 1, edges of the first partition wall, edges of the second partition wall, and the opening are processed at their corners.

In other words, edges of the first partition at the both ends of the first partition in the width direction are chamfered, and edges of the second partition at both ends of the second partition and at positions adjacent to the openings in the width direction are chamfered.

Aspect 3

In the liquid discharge head according to Aspect 1 or 2, the first partition wall has an uneven outer shape such that the both ends alternately occupy an opening corresponding position corresponding to the openings and an end corresponding position located outside the openings and inside the second partition wall.

In other words, the first partition has recesses and projections alternately arranged in a longitudinal direction orthogonal to the width direction and the bonding direction at the both ends of the first partition in the width direction. Both ends of the projections are disposed outside the openings and inside both ends of the second partition in the width direction. Both ends of the recesses are disposed within ranges of the openings in the width direction, respectively.

Aspect 4

In the liquid discharge head according to any one of Aspects 1 to 3, the damper (i.e., the flexible damper) has a compliance of $7\times10^{-17}$ $m^3$/Pa or more, Young's modulus of 3 to 200 GPa, and a thickness of 2 to 10 μm.

Aspect 5

In the liquid discharge head according to any one of Aspects 1 to 4, the damper has a laminated structure including a plurality of layers.

In other words, the flexible damper includes a lamination of multiple layers in the bonding direction.

Aspect 6

A liquid discharge device includes the liquid discharge head according to any one of Aspects 1 to 5.

In other words, a liquid discharge device includes multiple liquid discharge heads including the liquid discharge head according to any one of Aspects 1 to 5.

Alternatively, a liquid discharge device includes the liquid discharge head according to any one of Aspects 1 to 5 and a carriage mounting the liquid discharge head to move the liquid discharge head.

Aspect 7

A liquid discharge apparatus includes the liquid discharge device according to Aspect 6.

In other words, a liquid discharge apparatus includes the liquid discharge device according to Aspect 6, to discharge a liquid to a recording medium and a conveyor to convey the recording medium to a position facing the liquid discharge device.

Aspect 8

A liquid discharge apparatus includes the liquid discharge head according to any one of Aspects 1 to 5.

In other words, a liquid discharge apparatus includes the liquid discharge head according to any one of Aspects 1 to 5, to discharge a liquid to a recording medium and a conveyor to convey the recording medium to a position facing the liquid discharge head.

The above-described embodiments are illustrative and do not limit the present disclosure. Thus, numerous additional modifications and variations are possible in light of the above teachings, unless otherwise specified.

The advantages achieved by the embodiments described above are examples and therefore are not limited to those described above.

As described above, according to one aspect of the present disclosure, the damper does not receive a reaction force from the piezoelectric element holding substrate even when a foreign substance between the damper and the damper holding substrate is pressed. Accordingly, a liquid discharge head can be provided that prevents the damage to the damper and the leakage from channels in the substrate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a piezoelectric element;

a flexible damper having a first face and a second face opposite to the first face;

a first holding substrate bonded to the first face of the flexible damper in a bonding direction, the first holding substrate having:

a recess accommodating the piezoelectric element;

a first partition having a first width in a width direction orthogonal to the bonding direction; and first side spaces partitioned by the first partition, the first side spaces facing the first face of the flexible damper;

a second holding substrate bonded to the second face of the flexible damper in the bonding direction, the second holding substrate having:

a second partition opposed to the first partition via the flexible damper, the second partition having a second width wider than the first width in the width direction; and second side spaces partitioned by the second partition, the second side spaces facing the second face of the flexible damper; and openings at both ends of the first partition in the width direction, the openings respectively opposed to the both ends of the first partition via the flexible damper.

2. The liquid discharge head according to claim 1, wherein edges of the first partition at the both ends of the first partition in the width direction are chamfered, and edges of the second partition at both ends of the second partition and at positions adjacent to the openings in the width direction are chamfered.

3. The liquid discharge head according to claim 1, wherein the first partition has recesses and projections alternately arranged in a longitudinal direction orthogonal to the width direction and the bonding direction at the both ends of the first partition in the width direction, both ends of the projections are disposed outside the openings and inside both ends of the second partition in the width direction, and both ends of the recesses are disposed within ranges of the openings in the width direction, respectively.

4. The liquid discharge head according to claim 1, wherein the flexible damper has:

a compliance of $7\times10^{-17}$ $m^3/Pa$ or more;

Young's modulus of 3 to 200 GPa; and a thickness of 2 to 10 μm.

5. The liquid discharge head according to claim 1, wherein the flexible damper includes a lamination of multiple layers in the bonding direction.

6. A liquid discharge device comprising:

multiple liquid discharge heads including the liquid discharge head according to claim 1.

7. A liquid discharge apparatus comprising:

the liquid discharge device according to claim 6, to discharge a liquid to a recording medium; and a conveyor to convey the recording medium to a position facing the liquid discharge device.

8. A liquid discharge device comprising:

the liquid discharge head according to claim 1; and a carriage mounting the liquid discharge head to move the liquid discharge head.

9. A liquid discharge apparatus comprising:

the liquid discharge device according to claim 8, to discharge a liquid to a recording medium; and a conveyor to convey the recording medium to a position facing the liquid discharge device.

10. A liquid discharge apparatus comprising:

the liquid discharge head according to claim 1, to discharge a liquid to a recording medium; and a conveyor to convey the recording medium to a position facing the liquid discharge head.

* * * * *